US010992539B2

United States Patent
Pitta et al.

(10) Patent No.: US 10,992,539 B2
(45) Date of Patent: *Apr. 27, 2021

(54) METHODS AND SYSTEMS FOR NEIGHBOR-ACKNOWLEDGED GRACEFUL INSERTION/REMOVAL PROTOCOL

(71) Applicant: Cisco Technology, Inc., San Jose, CA (US)

(72) Inventors: Srinivas Pitta, Cupertino, CA (US); Shrawan Chittoor Surender, Sunnyvale, CA (US); Satish Kumar Kondalam, Milpitas, CA (US); Somnath Roy, Fremont, CA (US); Siddartha Gundeti, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,634

(22) Filed: Nov. 11, 2019

(65) Prior Publication Data
US 2020/0076702 A1 Mar. 5, 2020

Related U.S. Application Data

(63) Continuation of application No. 15/175,126, filed on Jun. 7, 2016, now Pat. No. 10,498,606.

(51) Int. Cl.
*H04L 12/24* (2006.01)

(52) U.S. Cl.
CPC .......... *H04L 41/12* (2013.01); *H04L 41/0813* (2013.01)

(58) Field of Classification Search
CPC ..... H04L 41/12; H04L 41/0813; H04L 45/28; H04L 45/02; Y02D 30/00
See application file for complete search history.

(56) References Cited

U.S. PATENT DOCUMENTS 7,417,947 B1 * 8/2008 Marques ................. H04L 45/00
370/220
7,457,248 B1 * 11/2008 Ali ....................... H04L 43/0811
370/235

(Continued)

OTHER PUBLICATIONS

IEEE Std 802.1AB™-2009, IEEE Standard for Local and Metropolitan Area Networks-Station and Media Access Control Connectivity Discovery, IEEE Computer Society, 2009, 204 pages.

(Continued)

*Primary Examiner* — Umar Cheema
*Assistant Examiner* — James Ross Hollister
(74) *Attorney, Agent, or Firm* — Meunier Carlin & Curfman LLC

(57) ABSTRACT

Presented herein are systems, and methods thereof, that is configured to enter a maintenance mode to isolate itself from its neighbor and to gracefully cause neighbor devices to isolate themselves from the system, as to cause minimal or "zero" service disruption with its neighbors. The system broadcasts a maintenance-related message, via a standard transport layer, over routing protocols, to counter parts protocols at the neighbor device and waits for an acknowledgement message from the neighbor network devices. The broadcast and acknowledgement, through standard transport layer messaging, ensures that traffic generated by such protocols at the neighbor devices, regardless of manufacturer, are redirected before the system fully enters into the maintenance mode.

20 Claims, 13 Drawing Sheets

(56) References Cited

U.S. PATENT DOCUMENTS

| | | | |
|---|---|---|---|
| 8,386,593 B1* | 2/2013 | Gao | H04L 41/22 709/223 |
| 2005/0177634 A1* | 8/2005 | Scudder | H04L 45/22 709/225 |
| 2007/0159988 A1* | 7/2007 | Khan | H04L 45/18 370/256 |
| 2008/0031239 A1* | 2/2008 | Kapoor | H04L 45/56 370/389 |
| 2008/0192762 A1* | 8/2008 | Kompella | H04L 45/50 370/410 |
| 2010/0002577 A1* | 1/2010 | Moreno | H04L 41/12 370/221 |
| 2014/0269254 A1* | 9/2014 | Choorakkot Edakkunni | H04L 45/563 370/218 |
| 2017/0180210 A1* | 6/2017 | Lisouski | H04L 45/123 |

OTHER PUBLICATIONS

White Paper, "Arista EOS: Smart System Upgrade," 2014, 8 pages.
White Paper, "Graceful Insertion and Removal Mode on Cisco Nexus Switches," Cisco, 2015, 19 pages.

* cited by examiner

```
switch(config)# system mode maintenance
Following configuration will be applied:
router bgp 100
    isolate
router ospf 100
    isolate
router isis 100
    isolate
Do you want to continue (y/n)? [no] y
Generating a snapshot before going into maintenance mode
Starting to apply commands...
Applying : Maintenance Mode broadcasted
Applying : router bgp 100
Applying :    isolate
Applying : router ospf 100
Applying :    isolate
Applying : router isis 100
Applying :    isolate
Maintenance mode operation successful.
switch(config)#
```

FIG. 10

```
switch(config)# no system mode maintenance
Following configuration will be applied:
router isis 100
    no isolate
router ospf 100
    no isolate
router bgp 100
    no isolate
Do you want to continue (y/n)? [no] y
Starting to apply commands...
Applying : router isis 100
Applying :    no isolate
Applying : router ospf 100
Applying :    no isolate
Applying : router bgp 100
Applying :    no isolate
Maintenance mode operation successful.
Generating Current Snapshot
Please use 'show snapshots compare before_maintenance after_maintenance' to check the health of the system
switch(config)#
```

FIG. 11

```
switch(config)# system mode maintenance shutdown
Following configuration will be applied:
router bgp 100
    shutdown
router ospf 100
    shutdown
router isis 100
    shutdown
system interface shutdown
Do you want to continue (y/n)? [no] y
Generating a snapshot before going into the maintenance mode
Starting to apply commands...
Applying : router bgp 100
Applying :   shutdown
Applying : router ospf 100
Applying :   shutdown
Applying : router isis 100
Applying :   shutdown
Applying : system interface shutdown Maintenance mode operation successful.
switch(config)#
```

*FIG. 12*

```
switch(config)# no system mode maintenance
Following configuration will be applied:
no system interface shutdown
router isis 100
    no shutdown
router ospf 100
    no shutdown
router bgp 100
    no shutdown
Do you want to continue (y/n)? [no] y
Starting to apply commands...
Applying : no system interface shutdown
Applying : router isis 100
Applying :   no shutdown
Applying : router ospf 100
Applying :   no shutdown
Applying : router bgp 100
Applying :   no shutdown
Maintenance mode operation successful.
Generating Current Snapshot Please use 'show snapshots compare before_maintenance after_maintenance' to check the health of the system
switch(config)#
```

*FIG. 13*

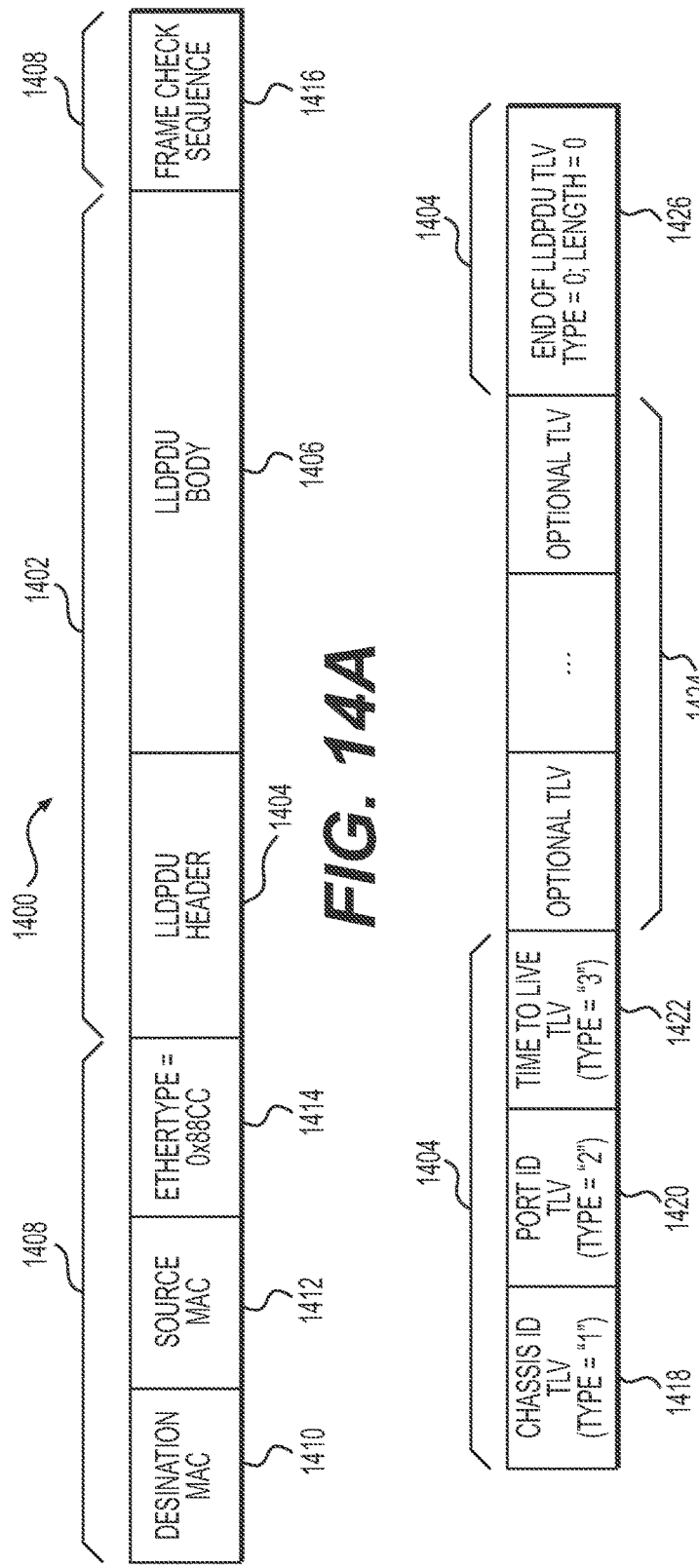
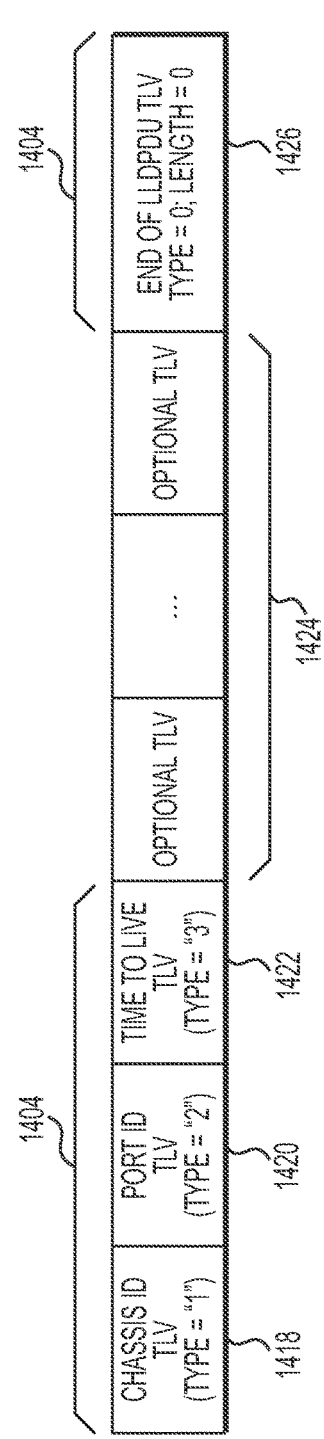
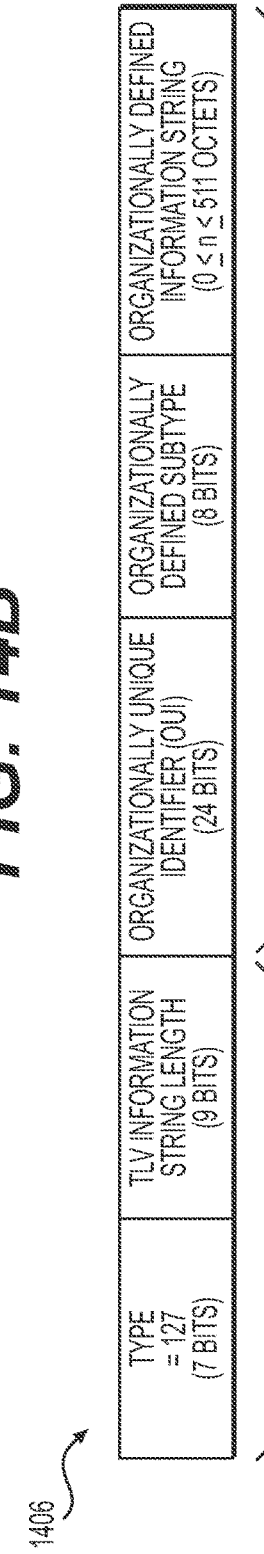
FIG. 14A
FIG. 14B
FIG. 14C

METHODS AND SYSTEMS FOR NEIGHBOR-ACKNOWLEDGED GRACEFUL INSERTION/REMOVAL PROTOCOL

RELATED APPLICATIONS

This application is a continuation of U.S. patent application Ser. No. 15/175,126, filed on Jun. 7, 2016, entitled "METHODS AND SYSTEMS FOR NEIGHBOR-ACKNOWLEDGED GRACEFUL INSERTION/REMOVAL PROTOCOL," the contents of which are hereby incorporated by reference its entirety.

TECHNICAL FIELD

The present disclosure relates to isolation of networking devices in a network for maintenance, removal, and insertion.

BACKGROUND

In data centers, during maintenance windows of network devices, e.g., for module installation, cabling changes, and firmware and software updates, the network device is isolated from other network devices, and traffic is redirected around the isolated device, to prevent disruptions to the data center operation. One class of network devices supports a graceful insertion/removal (GIR) mode, or entry and exit of the device into a maintenance mode, that disables and modifies routing configuration at the device. This graceful insertion/removal mode, or maintenance mode, may modify, for example, Layer-2 or Layer-3 protocol interfaces for the device to isolate the device from its neighbors. Certain classes of devices may modify their Border Gateway Protocol (e.g., BGPv4 or BGPv6); Multiprotocol BGP (MP-BGP) (e.g., VPNv4, VPNv6, Layer 2 VPN (L2VPN), and Ethernet VPN (EVPN)); Enhanced Interior Gateway Routing Protocol (EIGRP); Enhanced Interior Gateway Routing Protocol Version 6 (EIGRPv6); Intermediate System-to-Intermediate System (IS-IS); Open Shortest Path First (OSPF); Open Shortest Path First Version 3 (OSPFv3); Virtual PortChannel (vPC and vPC+); and FabricPath.

BRIEF DESCRIPTION OF THE DRAWINGS

FIGS. 10 and 11 are each diagrams illustrating graphical user interface associated with a network device when entering and exiting graceful insertion/removal (GIR) mode or maintenance mode, in accordance with an embodiment.

FIGS. 12 and 13 are each diagrams illustrating graphical user interface associated with a network device when entering and exiting shutdown mode, in accordance with an embodiment.

FIG. 14, comprising FIGS. 14A, 14B, 14C, and 14D, is a diagram illustrating an example maintenance LLDP message transmitted from a network device upon entering graceful insertion/removal (GIR) mode or maintenance mode and an example acknowledgement LLDP message transmitted from a neighbor network device in response to receipt of the maintenance LLPD message, in accordance with an embodiment.

DESCRIPTION OF EXAMPLE EMBODIMENTS

Overview

Figure 1:
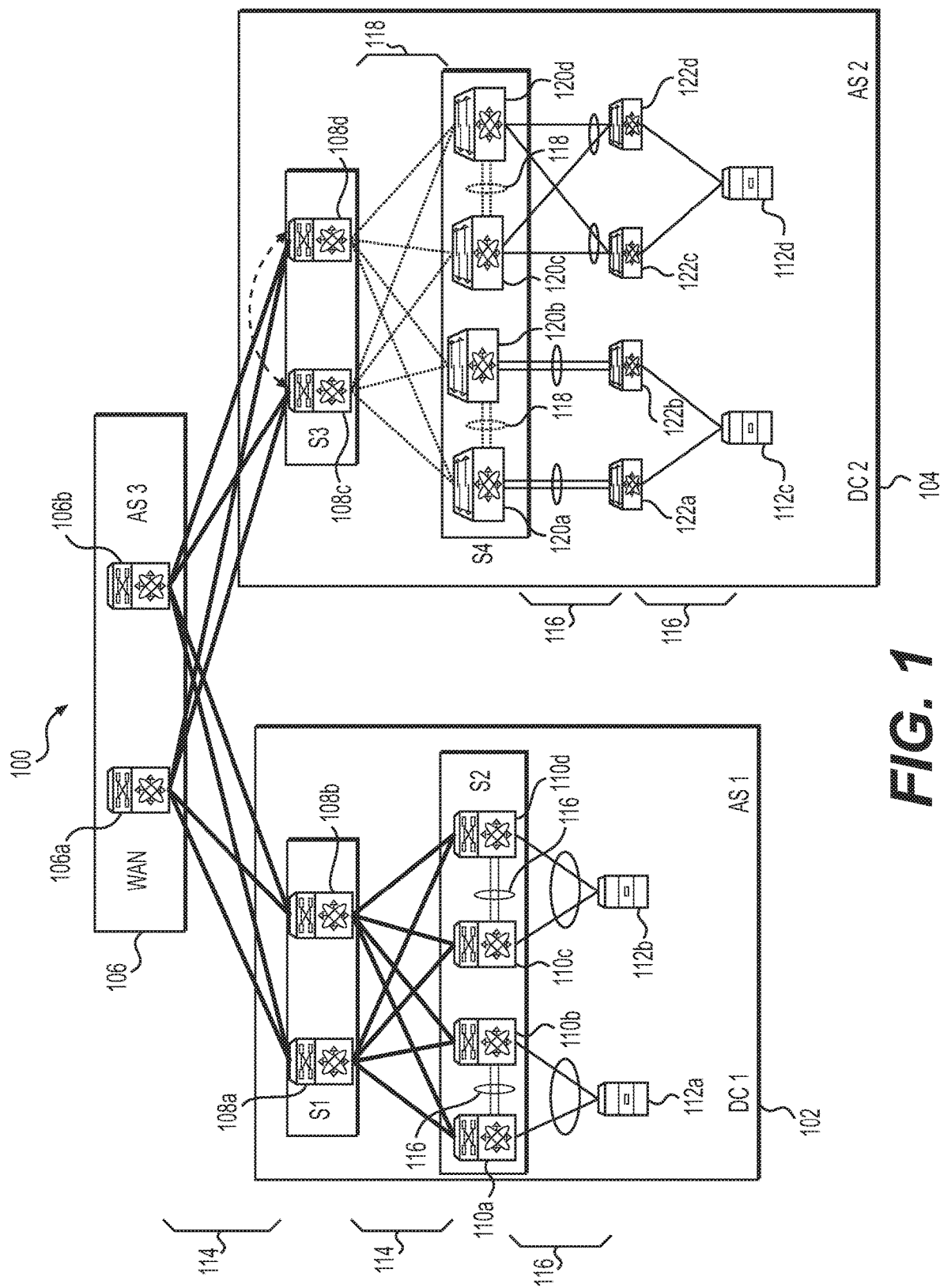
FIG. 1 is a diagram illustrating an example network that includes a network device configured to enter and exit graceful insertion/removal (GIR) mode or maintenance mode in response to a neighbor acknowledgement, in accordance with an embodiment.

Presented herein is a system, and a method thereof, that is configured to enter a maintenance mode and gracefully cause neighbor network devices to isolate themselves from the system, in addition to the system isolating itself from its neighbor, so as to cause minimal or "zero" service disruption with its neighbors. The system broadcasts a maintenance-related message, via a standard transport layer, over routing protocols, to counterpart protocols at the neighbor network device and waits for an acknowledgement message from the neighbor network devices.

In some embodiments, the maintenance-related message is broadcasted via each routing protocol and/or protocol instance running on a given device. The broadcast and acknowledgement, through standard transport layer messaging, ensures that traffic generated by such protocols at the neighbor devices, regardless of manufacturer, is redirected before the system fully enters into the maintenance mode. To this end, the message broadcast, via a transport layer message, facilitates streamline interoperable operations among neighbor network devices of different classes and manufacturers by not requiring instructions to execute at the application layer of the neighbor devices.

In some embodiments, the broadcast via a transport layer message facilitates use of a single command-line command to be executed at a given network device to cause the device to isolate itself from its neighbors and to further cause the device to prompt its neighbors to isolate themselves from the device.

Example Embodiments

According to an aspect, a system (e.g., a router or switch) is disclosed that is configured to transmit a maintenance message and to receive neighbor-acknowledged message that are each transmitted via the Link Layer Discovery Protocol (LLDP). The maintenance and acknowledgement LLDP messages facilitate communication of the system's maintenance mode state to the neighbor devices, regardless of device class or manufacturer, and, in some embodiments, facilitates communication of the neighbor's state of having redirected traffic around the system under maintenance or of having received the maintenance LLDP message.

In some embodiments, the system includes one or more network ports; a processor; and a memory (i.e., persistent storage) having instructions stored, thereon, wherein the instructions, when executed by the processor, cause the processor to: upon receiving a request to enter the system into a maintenance mode (e.g., referred to herein also as a "graceful insertion/removal mode" and "isolation mode"), transmit, via at least one of the one or more network ports, to one or more first network devices (e.g., neighbor routers or switches), a first message (e.g., a first LLDP message) associated with entry of the system into the maintenance mode, wherein each of the one or more first network devices is receiving data and control traffic from, and transmitting data and control traffic to, the system; and enter the system into the maintenance mode upon receipt of a second message (e.g., a second LLDP message) from each of the one or more first network devices to which the first messages were sent, wherein each second message comprises an acknowledgement by the given network device of the system entering into the maintenance mode.

In some embodiments, a plurality of first messages (e.g., first LLDP messages) are transmitted, each first message be transmitted for each routing protocol running on a network device.

In some embodiments, the first LLDP message is broadcasted by the system to all network devices neighboring the system. The LLDP message is used, at each neighbor device, to modify routing operations for the protocols operating thereat. Examples of such protocols includes, but not limited to, Protocol Independent Multicast (PIM); Border Gateway Protocol (BGP); Enhanced Interior Gateway Routing Protocol (EIGRP); Intermediate System-to-Intermediate System (IS-IS); Open Shortest Path First (OSPF); Routing Information Protocol (RIP); Open Shortest Path First (OSPF); and Virtual PortChannel (vPC). To this end, in some embodiments, in response to receiving the first LLDP message, each neighbor network device is configured to modify its forwarding information base (FIB) or routing information base (RIB) to remove a forwarding or routing identifier associated with the system therefrom. In some embodiments, the neighbor network device is configured to modify its forwarding information base (FIB) or routing information base (RIB) associated with a given routing protocol to remove a forwarding or routing identifier associated with the system therefrom. In other embodiments, a routing parameter associated with the system is modified to cause traffic (including data and control traffic) to be routed around the system.

The system (e.g., the network device entering maintenance mode) is configured to transmit the first LLDP message upon entry into the maintenance mode and, in some embodiments, to wait to finalize the isolation sequence (i.e., to disable its network interfaces) until all acknowledgement messages are received from network devices to which the first LLDP message is sent. In some embodiments, the system waits for an acknowledgement message for each first LLDP message transmitted for each routing protocol. In some embodiments, the system may finalize the isolation sequence after a defined time after the sending of the LLDP message.

The system is configured, in some embodiments, to disable or adjust protocol interfaces according to a given sequence in which the system withdraws from BGP, then the system reroutes EIGRP, then the system reroutes OSPF, then the system reroutes IS-IS, then the system shutdowns VPC.

According to another aspect, a system (e.g., a neighbor network device) includes one or more network ports; a processor; and a memory (i.e., persistent storage) having instructions stored, thereon, wherein the instructions, when executed by the processor, cause the processor to: in response to receiving a maintenance-related message from a network device, transmit, to the network device, an acknowledgement message (e.g., an acknowledgement LLDP message). In some embodiments, the system (e.g., the neighbor network device) is configured to modify one or more protocol interfaces having a forwarding or routing association with the network device and to transmit the acknowledgement message when the modified protocol interfaces have been re-routed and converged to one or more different network devices in the network. In other embodiments, the acknowledgement message is sent upon, and in response to, the broadcasted message from the system has been received.

In some embodiments, the first LLDP message comprises a Link Layer Discovery Protocol Data Unit (LLDPDU) header and a LLDPDU body, wherein the LLDPDU body includes an organizational-specific message associated with a maintenance advertisement. The neighbor devices may use the LLDP message to trigger a protocol command to enable, disable, or adjust routing parameters for the protocol interfaces having an association with the isolating system. In some embodiments, the maintenance message and/or acknowledge message each comprises a unique symbol associated with a maintenance or acknowledgement activity. In some embodiments, the maintenance message and/or acknowledgement message each comprises a bit value in the LLDPDU header. In some embodiments, the maintenance message and/or acknowledgement message each comprises a string value.

Example Network

FIG. 1 is a diagram illustrating an example network 100 that includes one or more network devices configured to enter and exit graceful insertion/removal (GIR) mode or maintenance mode upon receipt of a neighbor acknowledgement, in accordance with an embodiment. The network 100 may be implemented, for example, in a data center.

Referring still to FIG. 1, the network 100 includes a first data center (shown as "DC1 102") and a second data center (shown as "DC2" 104) connected via a common WAN layer 106 comprising WAN-layer switches 106a and 106b. The WAN-layer switches 106a, 106b are running Layer-3 type links 114, for example, Intermediate System-to-Intermediate System (IS-IS) protocol and Border Gateway Protocol (BGP), with Layer-3 (L3) switches 108 (also referred to as "spine-layer switches" 108a, 108b, 108c, and 108d) at data center "DC1" 102. Layer-3 type switches determine ports for packet forwarding using the destination interne protocol (IP) address of the received packet. The spine-layer switches 108a, 108b are running OSPF (Open Shortest Path First) protocol within the data center "DC1" 102 and running IS-IS (Intermediate System-to-Intermediate System) and BGP (Border Gateway Protocol) to the WAN 106. The leaf-layer switches (shown as 110a, 110b, 110c, and 110d) (also referred to as "vPC switches" 110a-d) are configured as vPC (Virtual PortChannel) pairs to servers (shown as 112a, 112b). The vPC switch pairs (110a, 110b and 110c, 110d) communicate with each other and with the servers 112 (shown as 112a and 112b) via Layer-2 links 116. Layer-2 type switches, for example, determine ports for packet forwarding using the destination media access control (MAC) address of the received packet and a forwarding table.

In FIG. 1, the neighbor devices of the WAN switch (e.g., 106a) may include the Layer-3 type switches (e.g., 108a, 108b) and other WAN switches (e.g., 106b). The neighbor devices of the Layer-3 type switches (e.g., 108a, 108b) may include the WAN switches (e.g., 106a), the leaf-layer switches (e.g., 110a, 110b, 110c, and 110d), and other devices in the data center "DC1" 102 (e.g., 112a, 112b) to which it communicates via OSPF. The neighbor devices of the vPC switches (e.g., 110a, 110b, 110c, or 110d) may include its pairing vPC switch, downstream devices (e.g., servers 112a or 112b), and upstream devices (e.g., the Layer-3 type switches 108a and 108b).

Referring still to FIG. 1, data center "DC2" 104 uses a FabricPath network 118 in which the spine-layer switches (shown as 108c and 108d) are HSRP peers (i.e., "Hot Anycast Hot Standby Router Protocol" peers). As shown, the spine switches 108c and 108d hosts virtual interfaces (SVIs) to each other and also participates in BGP routing with the WAN layer 106. A pair of Layer-2 leaf switches (shown as 120a and 120b) is configured as a vPC+ pair with a dual-homed fabric extenders (FEXs) (shown as 122a and 122b) with vPC+ connected to them. The server 112c uses a Link Aggregation Control Protocol (LACP) Enhanced vPC+ (evPC+) connection to the two dual-homed fabric extenders 122a, 112b. The other pair of Layer-2 leaf switches (shown as 120c and 120d) is configured as a vPC+ pair but with single-homed fabric extenders (shown as 122c and 122d) connected to them. The server 112d uses an LACP vPC+ connection to the two single-homed fabric extenders 122c, 122d.

In this example, the neighbor network devices of the WAN switch (e.g., 106b) may include the spine-layer switches (e.g., 108c, 108d) and other WAN switches (e.g., 106a). The neighbor network devices of the spine-layer switches (e.g., 108c, 108d) may include the WAN switches (e.g., 106b), the Layer 2 leaf switches (e.g., 120a, 120b, 120c, and 120d), and other spine-layer switches (e.g., 108c or 108d) as HSRP peers. The neighbor network devices of the Layer 2 leaf switches (e.g., 120a, 120b, 120c, and 120d) may include the spine-layer switches (e.g., 108c, 108d) and the fabric extenders (e.g., FEXs 122a and 122b). The neighbor network devices of the dual-homed fabric extenders (e.g., FEXs 122a and 122b) may include the server (e.g., 112c) and the connected Layer 2 leaf switches (e.g., 120a or 120b). The neighbor network devices of the single-homed fabric extenders (e.g., FEXs 122c and 122d) may include the servers (e.g., 112d) and the connected Layer 2 leaf switches (e.g., 120c and 120d).

In some embodiments, the maintenance message (e.g., maintenance LLDP message) is broadcasts to all nearest-bridge. In some embodiments, the maintenance message (e.g., maintenance LLDP message) is broadcasted to nearest non-TPMR (Two-port MAC relay) bridge. In some embodiments, the maintenance message (e.g., maintenance LLDP message) is broadcasted to a nearest customer bridge. In some embodiments, the maintenance message (e.g., maintenance LLDP message) is broadcasted to a group of MAC addresses. In some embodiments, the maintenance message (e.g., maintenance LLDP message) is transmitted to individual MAC addresses.

Figure 2:
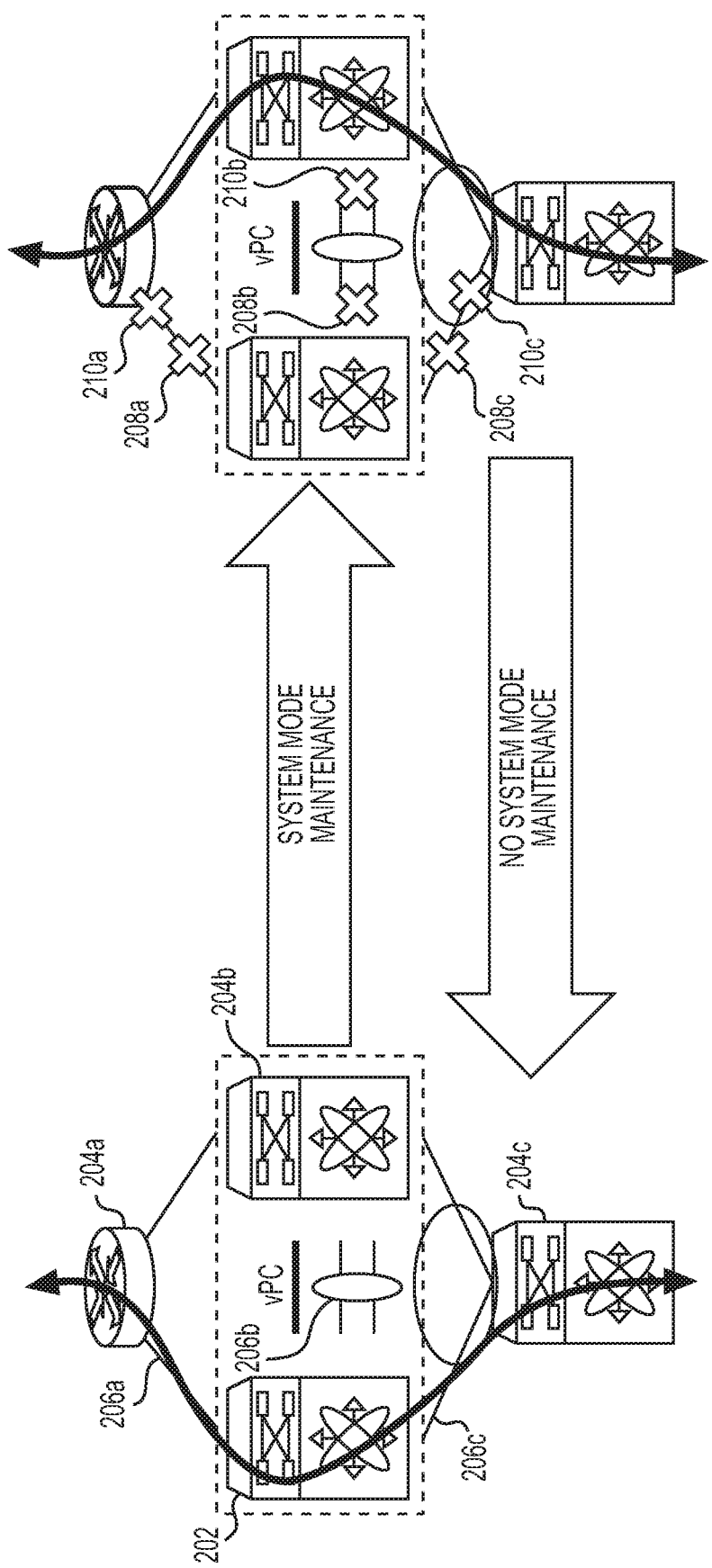
FIG. 2 is a diagram illustrating operations of a network device entering and exiting graceful insertion/removal (GIR) mode or maintenance mode, in accordance with an embodiment.

FIG. 2, comprising FIGS. 2A and 2B, is a diagram illustrating operation of a network device 202 entering and exiting graceful insertion/removal (GIR) mode or maintenance mode, in accordance with an embodiment. In FIG. 2A, the network device 202 is shown in operation with its neighbors (shown as devices 204a, 204b, and 204c) via links 206a, 206b, and 206c. Upon entry of the network device 202 into maintenance mode, the network device 202 initiates its isolation from other network devices (shown as 208a, 208b, 208c). In addition, the network device broadcasts a message to its neighbors so the neighbors also initiates isolation of the network device from their traffic (shown as 210a, 210b, and 210c). The broadcast may be initiated via a single set of command-line commands (e.g., a first command to initiate or enter maintenance mode and a second command to confirm the action) from the network device 202.

Neighbor-acknowledgement GIR, or maintenance, mode may be used to isolate the network device from the network to perform real-time debugging, hardware installation, cabling, and erasable programmable logic device (EPLD) upgrades.

The broadcast of the maintenance mode state at the network device 202 provides a proactive means to isolate the maintenance device (i.e., device entering maintenance mode) from neighbor network devices and for neighbor network devices to isolate themselves from the maintenance device. When routing protocols are changed only at a network device, the change will propagate, with time, to cause a change to the routing protocols at the device's neighbors. This means of isolating the network device from neighbor network devices introduce variability in a maintenance event. For example, the time for the routing updates to occur at a given neighbor network device from the initiation of maintenance mode of the network device can vary. To this end, isolation of the network device can result in traffic drop if the network device entering maintenance mode is prematurely disconnected before routing changes have propagated to neighbor network devices. This variability also increases the time for the network device to enter maintenance mode without disrupting the network. In addition, network operators cannot measure or determine the time it takes for a device to be fully in maintenance mode such that all protocols have converged, and no traffic is incoming to the device.

Certain classes of network devices attempt to synchronize states between devices via a proprietary protocol for graceful insertion/removal of the devices into maintenance mode. The use of proprietary protocol and proprietary operations are complicated and may limit interoperability of these features to devices with supported functionality and may limit operations in a heterogeneous network environment (e.g., an environment with devices from multiple vendors and manufacturers).

Because acknowledgement and maintenance LLDP messages, as a standard transport layer message, can be received by any devices, the instant system and method promotes interoperability in a heterogeneous network environment. In some embodiments, the maintenance LLDP message and the acknowledgement LLDP message are invoked from the LLDP management client via a protocol, e.g., IGMP, BGP, vPC, PIM, EIGRP, IS-IS, RIP, or OSPF.

In some embodiments, each maintenance LLDP message and each acknowledgement LLDP message are invoked from the LLDP management client from an application executing on a given network device. In some embodiments, a single maintenance LLDP message is transmitted for the network device for all the routing protocols running thereon and a single acknowledgement message is received from each neighbor device to which the maintenance LLDP message is transmitted.

Examples of the network device 202 include a Layer 3 Switch, a vPC switch, a leaf switch, a FabricPath Spine Switch, and a FabricPath Layer 2 Spine Switch. Network devices 202 may further include, but not limited to, routers, other type L2 and/or L3 switches, and other network devices such as network addressor translation (NAT) devices, intrusion prevention systems (IPS), intrusion detection systems (IDS), deep packet inspection (DPI) devices, firewall, computing devices executing a virtual switch, network-attached storage (NAS) devices, load balancer (LB) systems, wide-area network/local-area network (WAN/LAN) accelerators, computing systems executing a virtual machine (VM), telephone devices, access points, repeaters, and cable devices.

Example Processes

Figure 3:
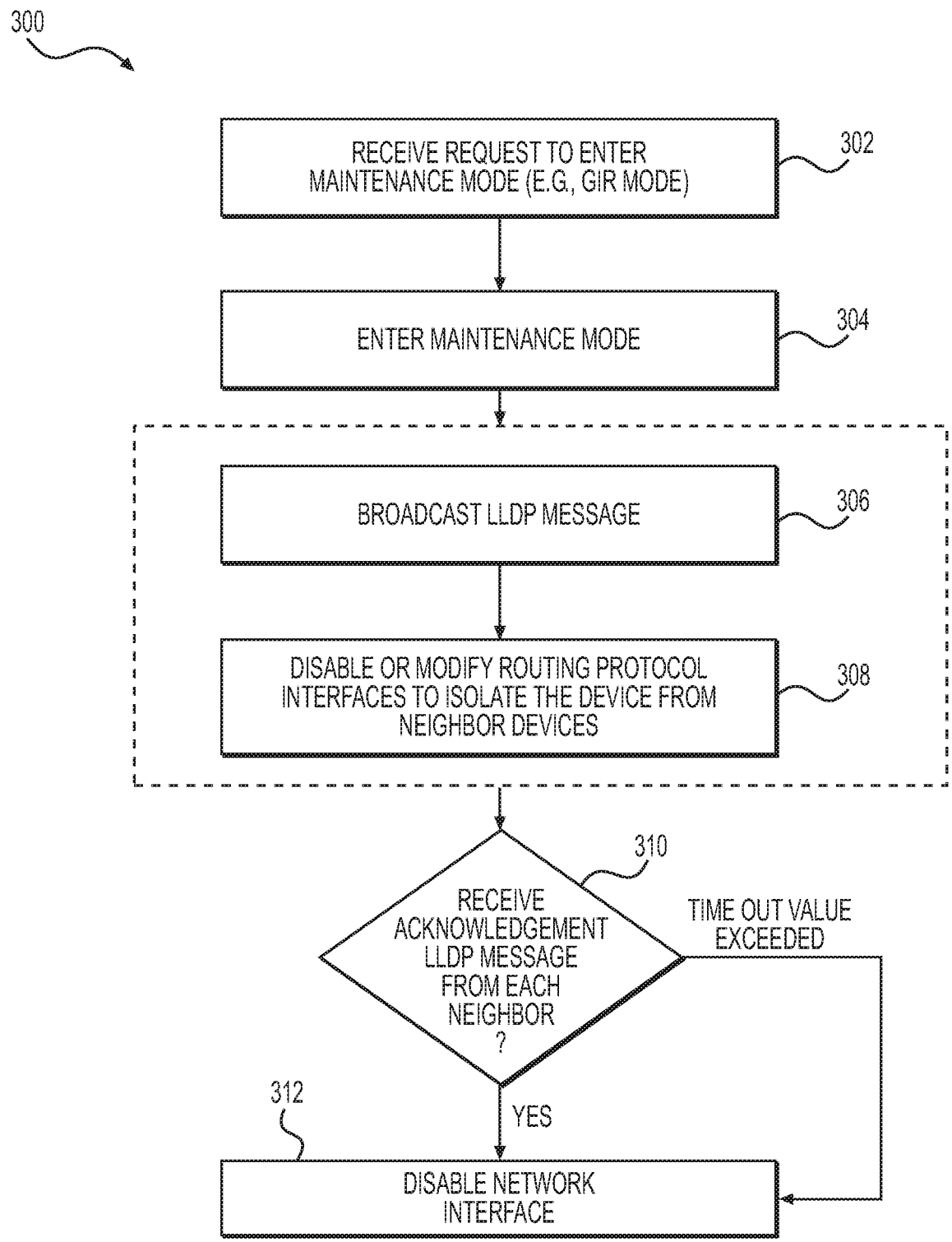
FIGS. 3, 4, and 5 are each a flow chart of a method of operating graceful insertion/removal (GIR) mode or maintenance mode, in accordance with an embodiment.
Figure 4:
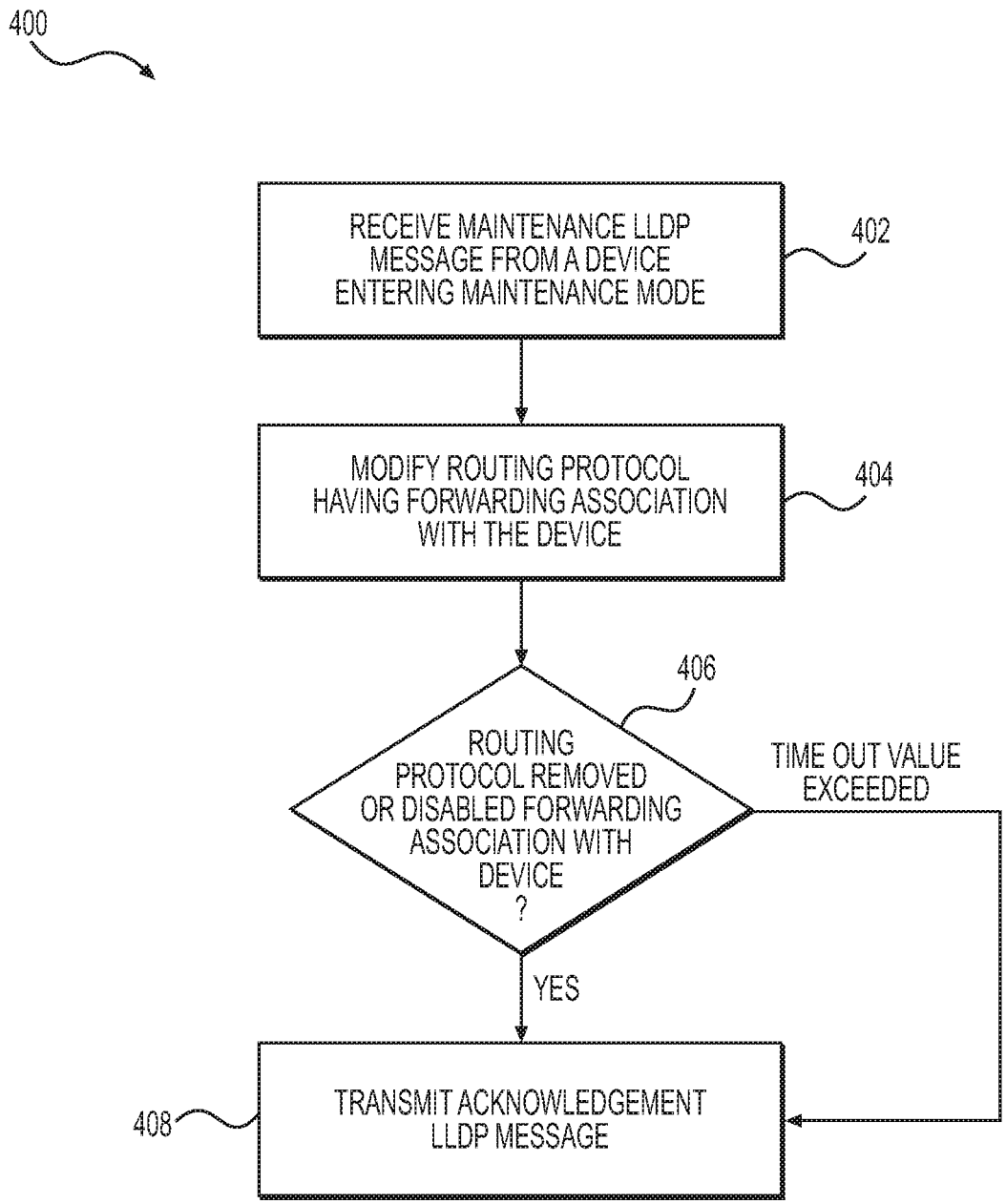
Figure 5:
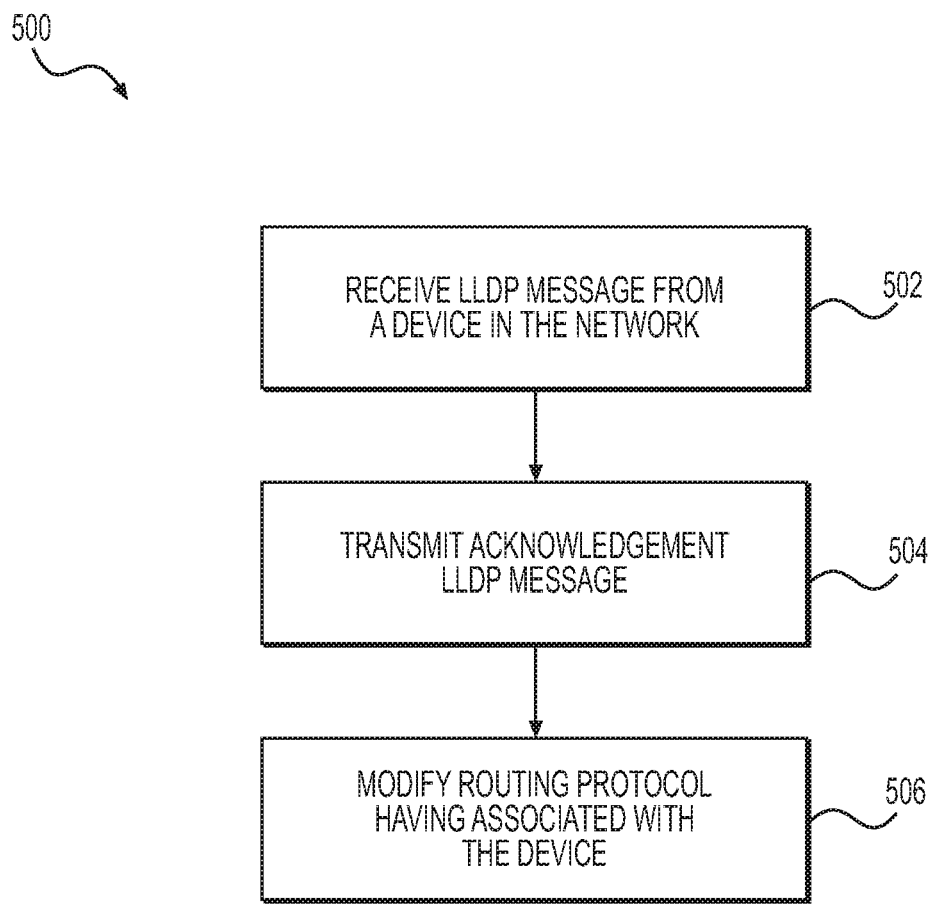

FIGS. 3, 4, and 5 are each diagrams illustrating a flow chart of a method of operating graceful insertion/removal (GIR) mode or maintenance mode, in accordance with an embodiment. In particular, FIG. 3 illustrates a process at a device to enter maintenance mode by isolating itself from neighbor network devices and by causing neighbor network devices to isolate themselves from the device. FIGS. 4 and 5 illustrate processes at a neighbor network device to provide an acknowledgement message to the device.

Referring to FIG. 3, the method 300 includes, in a network, receiving (step 302), by a first computing device 100 (e.g., a network device entering GIR or maintenance mode), a request for the first network device to enter into a graceful insertion/removal (GIR) mode or a maintenance mode. In some embodiments, the request is received as an application-programming interface (API) command. In some embodiments, the request is a command-line command invoked at a remote computing device that interfaces with the first computing device. In other embodiments, the request is a command invoked at the remote computing device executing a script. In some embodiments, the request is initiated with a command line command associated with entry of a given device into a maintenance mode and a confirmation of the entry of the device into maintenance mode.

In response to the request, the first computing device is configured to enter (step 304) into maintenance mode.

In the maintenance mode, the first computing device is configured to broadcast (step 306) a LLDP message (e.g., a maintenance LLDP message) associated with entry of the first network device into a maintenance state. In some embodiments, the message is broadcasted (i.e., transmitted to multiple network devices) via a message having a plurality of multicast or unicast destination addresses associated with a set of neighbor network devices.

In addition, in the maintenance mode, the first computing device is configured to modify (step 308) its routing protocol to isolate itself from its neighbors. In some embodiments, for vPC, the first computing device changes its priority value to a max value ("65635") to advertise state as "self-isolated" over a peer keep-alive link. In FabricPath, the first computing device set the Overload bit, which is then advertised via FabricPath to neighbor network devices. For routing protocols (e.g., OSPF, IS-IS, BGP, etc.), the first computing device, in some embodiments, increases routing metrics to favor other device paths in the network. For example, for OSPF, the neighbor network device may set the "max metric router-lsa" command; for IS-IS, the neighbor network device may set the "overload bit" command; for BGP, the neighbor network device may set the "as-path prepend" command.

In some embodiments, the first computing device is configured to initiate modification (shown as step 308) of its routing protocol to isolate itself from its neighbors and then to broadcast (shown as step 306) the LLDP message (e.g., a maintenance LLDP message) associated with entry of the first network device into a maintenance state.

Referring still to FIG. 3, the first computing device, in some embodiments, waits (step 310) for acknowledgement messages from each neighbor network devices to which the broadcast maintenance message was sent. Upon the acknowledgement messages being received, the first computing device is configured to proceed in the maintenance mode and disable (step 312) its network interfaces. In some embodiments, the first computing device proceeds in the maintenance mode to disable network interfaces after a time-out value for receiving the acknowledgement messages has exceeded or after a pre-defined time has elapsed after the maintenance message was sent.

Referring to FIG. 4, the method 400 includes receiving (step 402), at a system (e.g., neighbor network devices), from a network device (i.e., device entering GIR mode), a first Link Layer Discovery Protocol (LLDP) message associated with entry of the network device into a maintenance mode. Here, the neighbor network device is configured, to receive data and control traffic from, and transmitting data and control traffic to, the network device. In response to receiving the first message, the neighbor network device is configured to modify (step 404) routing protocols having forwarding association with the network device entering maintenance state. In some embodiments, the neighbor network device removes a forwarding identifier associated with the network device from a forwarding table such as a forwarding information base (FIB) or a routing-information base (RIB). In other embodiments, the neighbor network device modifies routing parameters associated with one or more routing protocols executing thereat, e.g., to increase favor to network paths associated with other network devices or to decrease favor to the network path associated with the maintenance-entering network device.

Upon the neighbor network device having removed or disabled forwarding associations with the maintenance-entering network device (step 406), the neighbor is configured to generate and transmit (step 408), to the maintenance-entering network device, a second LLDP message that includes an acknowledgement of the network device entering into the maintenance mode.

In some embodiments, rather than sending the acknowledgement of the network device after making modification routing protocols, the neighbor network device is configured to transmit the second LLDP message upon receipt of the first LLDP message.

As shown in FIG. 5, the method 500 includes receiving (step 502), at a system (e.g., neighbor network devices), from a network device (i.e., device entering GIR mode), a first Link Layer Discovery Protocol (LLDP) message associated with entry of the network device into a maintenance mode. Upon receiving the first LLDP message, the neighbor is configured to generate and transmit (step 504), to the maintenance-entering network device, a second LLDP message that includes an acknowledgement of the network device entering into the maintenance mode. Subsequently, the neighbor network device is configured to modify (step 506) the routing protocols having forwarding association with the network device entering maintenance state.

In some embodiments, the maintenance message and acknowledgement message maybe be used during a device shutdown to minimize service disruption with the device's neighbors.

In some embodiments, the maintenance message may be transmitted upon a device entering a network.

Figure 6:
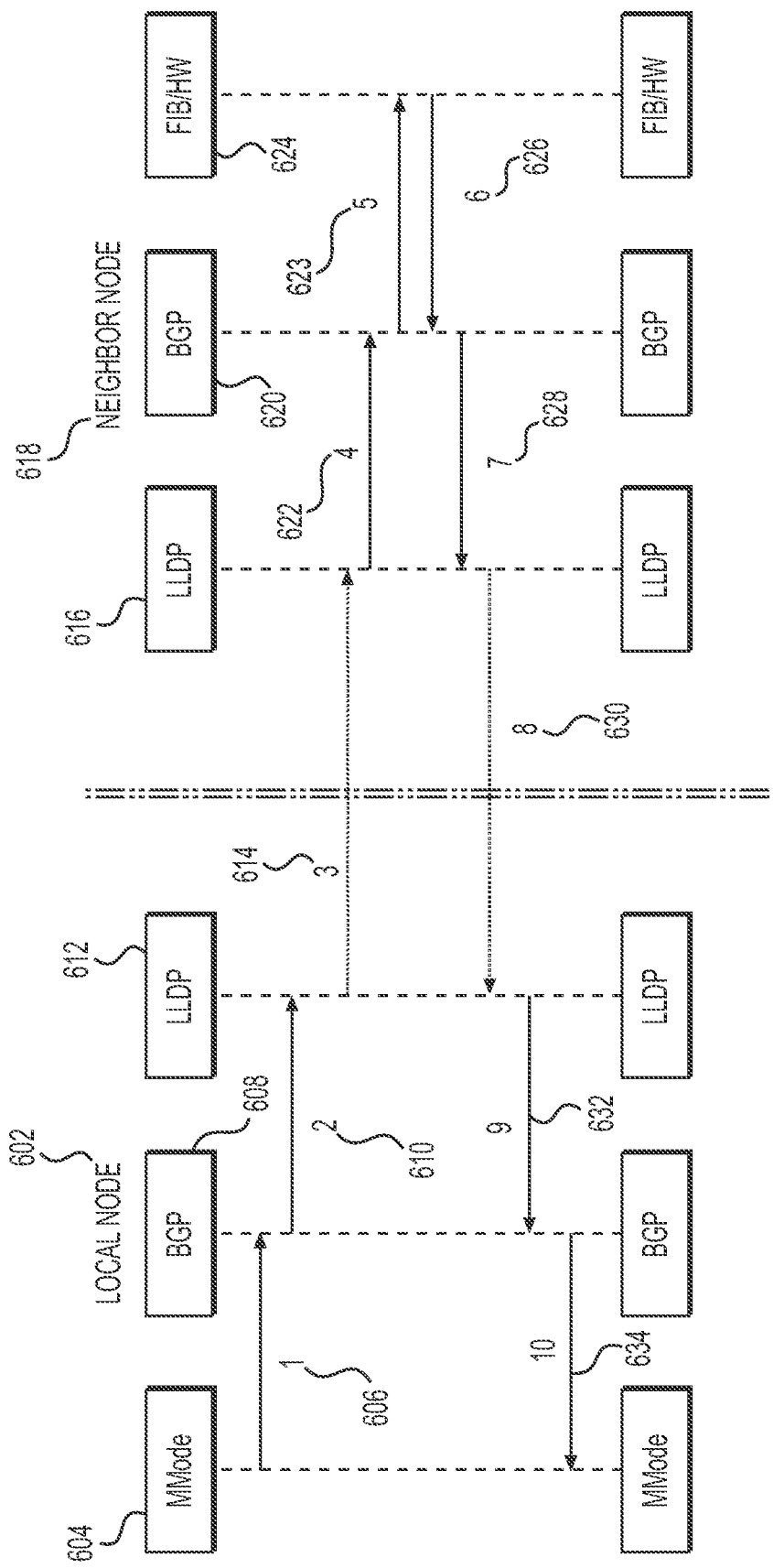
FIG. 6 is a water-fall diagram illustrating communication between a network device and a neighboring network device when the network device is entering graceful insertion/removal (GIR) mode or maintenance mode, in accordance with an embodiment.

FIG. 6 is a water-fall diagram illustrating communication between a network device and a neighbor network device when the network device is entering graceful insertion/removal (GIR) mode or maintenance mode, in accordance with an embodiment.

The network device causes the routing protocol executing thereat to trigger transmission of a LLDP message, as a transport layer message, to peer and neighbor network devices. The peer and neighbor network devices receives the LLDP message and delivers the payload to a corresponding routing protocol (e.g., BPG) executing thereat. The routing protocol running at the neighbor network device then triggers transmission of an acknowledgement LLDP message to the network device. The network device receives the acknowledgement LLDP message and delivers the payload the routing protocol, which provides the information to the application layer.

As shown in FIG. 6, upon entering maintenance or GIR mode 604, a network device (shown as "local node" 602) invokes (606) a command to a BGP routing-protocol layer (shown as 608). The BGP routing-protocol layer (608) triggers, via an API call (shown as 610), e.g., to a LLDP management client (shown as 612), transmission of a LLDP message, e.g., a broadcast (shown as 614) to peer and neighbor network devices 618. In some embodiments, an API call is called from each routing protocols running on the network device to isolate the network device from each corresponding routing protocol running on neighbor network devices. An example API call to the LLDP management client is shown in Table 1.

TABLE 1 status lldp_enter_maintenance_mode(protocol, instance, sender_id, msg_type, additional_parameters);
tatus lldp_enter_normal_mode(protocol, instance, sender_id, msg_type, additional_parameters);

As shown in Table 1, the API call may specify a protocol type (shown as "protocol"), a protocol instance (shown as "instance"), a sender identifier (shown as "sender_id"), a message type (shown as "msg_type"), and additional parameters (shown as "additional_parameters"). In some embodiments, protocol type specifies the type of protocol at the neighbor device to notify such as BGP, ISIS, OSPF, EIGRP, RIP, etc. The acknowledge message, in some embodiments, contains the same 'protocol' type. In some embodiments, the protocol instance ('instance') specifies the instance number of the protocol to facilitate isolation of each of the multiple instances of the protocol running on the network device. Acknowledge message, in some embodiments, contains the same instance number. The sender identifier ('sender_id') specifies the device ID which is sending the message. In some embodiments, the sender identifier is unique in the network, e.g., a network address, a MAC address, an IP address, a port identifier, or a combination thereof. Acknowledge message should contain a neighbor identifier that is also unique. The message type ('msg_type') specifies a request or a response. For example, the maintenance LLDP message may be a request, and the acknowledgement LLDP message may be a response. The additional parameters ('additional_params'), in some embodiments, includes (optional) parameters that is specific to the protocol. Examples of the additional parameters include 'status' flags (e.g., done, in_progress, failed, etc.) for 'response' message types; 'egress_interface_list' contains the list of egress interfaces through which LLDP message should be sent out; and 'graceful_recovery' for BGP.

Table 1 further shows an example API call to enter the network device into normal mode (i.e., exit the GIR or maintenance mode). In some embodiments, the API call to exit the GIR or maintenance mode also includes a protocol type (shown as "protocol"), a protocol instance (shown as "instance"), a sender identifier (shown as "sender_id"), a message type (shown as "msg_type"), and additional parameters (shown as "additional_parameters").

Referring back to FIG. 6, corresponding LLDP management clients (shown as 616 for a single client) at the peer and neighbor network devices 618 receive the LLDP message. The LLDP management clients 616 parses the LLDP message, determines a TLV therein is associated with a maintenance mode, and delivers (shown as 622) the payload to a routing protocol (shown as a "BGP" routing protocol 620). The BGP routing protocol 620 modifies (shown as 623) forwarding association with the network device 602, e.g., the FIB, RIB, and/or associated hardware (shown as "FIB/HW" 624) of the neighbor network device 618 to remove routing or address identifier associated with the network device 602 or to modify routing metrics associated directly or indirectly therewith. For example, the routing metrics are modified to favor other neighbor network device or network paths or disfavor the network device and paths thereto.

Referring still to FIG. 6, upon the FIB/HW 624 being modified (shown as 626), the BGP routing protocol 620 triggers, via an API call (shown as 628), e.g., to the LLDP management client at the neighbor network device 618, transmission of a second LLDP message (shown as 630) to the LLDP management client 612 executing at the network device 602. Upon receipt of the second LLDP message 630, the LLDP management client 612 parses the LLDP message 630, determines a TLV therein is associated with a maintenance mode, and delivers (shown as 632) the payload to the routing protocol 608 of the network device 602. In some embodiments, the routing protocol 608 waits for an acknowledgement message from each device to which the LLDP message sent. The routing protocol 608 then, in some embodiments, return a call-back (shown as 634) to the API call 606 invoked in the maintenance mode 604. The call-back return indicates that the neighbor network devices have acknowledged receipt of maintenance state associated with the network device 602.

Figure 7:
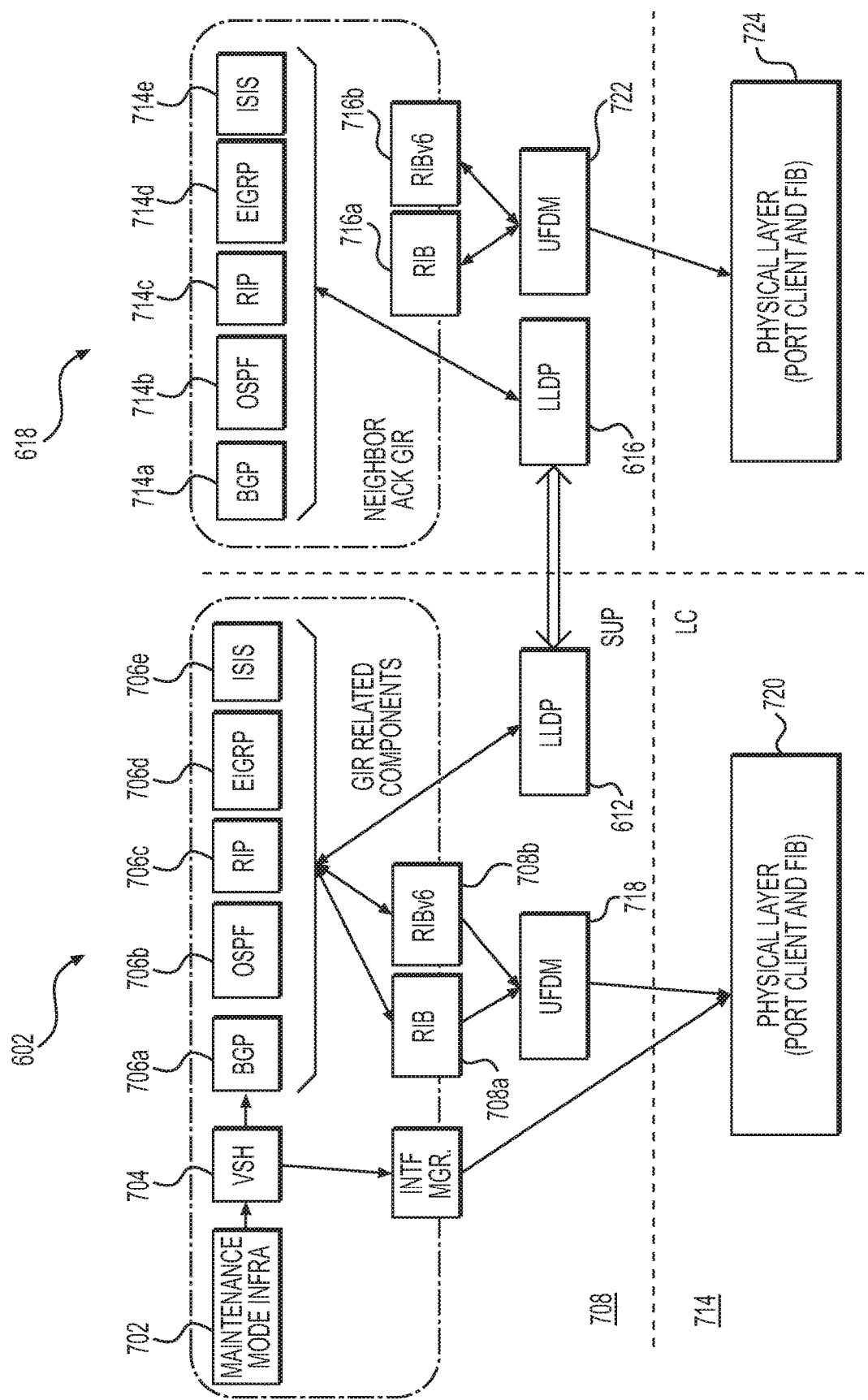
FIG. 7 is a diagram illustrating software architecture of a graceful insertion/removal (GIR) mode or maintenance mode, in accordance with an embodiment.

FIG. 7 is a diagram illustrating software architecture of a graceful insertion/removal (GIR) mode or maintenance mode, in accordance with an embodiment. As shown in FIG. 7, a request, e.g., an API or command-line command, (shown as "Maintenance Mode Infra" 702) for a network device to enter maintenance mode, is received at a supervisory engine 708, as a virtual shell command (shown as "VSH" 704), e.g., via an Embedded Event Manager (EEM). The EEM invoke API or function calls to each of the routing protocols, including, e.g., BGP (706a), OSPF (706b), RIP (706c), EIGRP (706d), and ISIS (706e). The routing protocols 706 modifies the routing table 708 (shown as "RIB" 708a and "RIBv6" 708b) associated with the network device. A unicast FIB distribution module 718, in some embodiments, then modifies the physical layer 720, including, e.g., the port client and forwarding information base (FIB), of the network device 602.

In addition, each routing protocol (e.g., BGP as shown in relation to FIG. 6) calls the LLDP management client 612 to generate a LLDP message corresponding to a "Device in GIR" state and to transmit, e.g., via a broadcast to neighbor network devices the generated LLDP message to corresponding LLDP management client 616 executing on peer and neighbor network devices 618. The message payload may include a bit value associated with an identifier corresponding to the maintenance state (e.g., "1"); a character string, e.g., reciting "Device in GIR"; or a unique symbol, e.g., a 24-bit value, associated with GIR state. Upon receiving the maintenance LLDP message, the corresponding LLDP management client 616 may transmit an acknowledgement LLDP message to the LLDP management client 612 and upon parsing the received LLDP message to determine a maintenance state message in the payload, invoke one or more function or API calls to routing protocols, including, BGP (714*a*), OSPF (714*b*), RIP (714*c*), EIGRP (714*d*), and ISIS (714*e*). One or more of the routing protocols 714 modify the routing table 716 (shown as "RIB" 716*a* and "RIBv6" 716*b*) associated with the neighbor network device 618. A unicast FIB distribution module 722 on the neighbor network device 618, in some embodiments, then modifies the physical layer 724, including, e.g., the port client and forwarding information base (FIB), of the neighbor network device 724. The message payload may include a bit value associated with an identifier corresponding to the acknowledgement (e.g., "0"); a character string, e.g., reciting "GIR acknowledged"; or a unique symbol, e.g., a 24-bit value, associated with GIR state.

Figure 8:
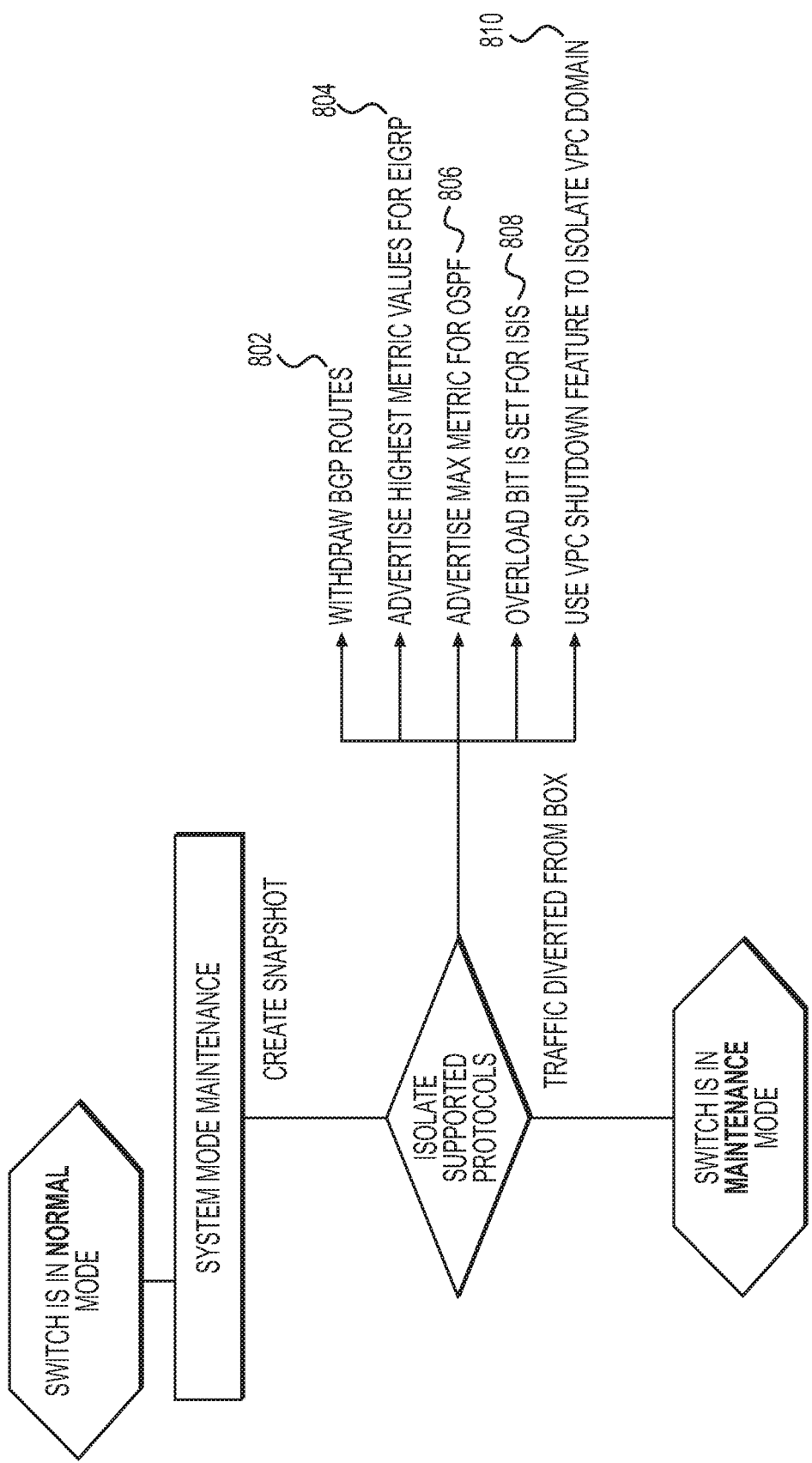
FIGS. 8 and 9 are each diagrams illustrating a flowchart of a sequence to isolate a network device from neighbor network devices when entering graceful insertion/removal (GIR) mode or maintenance mode, in accordance with an embodiment.

FIG. 8 illustrates a flowchart of a sequence to isolate a network device from neighbor network devices when entering graceful insertion/removal (GIR) mode or maintenance mode, in accordance with an embodiment. As shown in FIG. 8, upon entering maintenance mode, a given network device withdraws BGP routes (shown as 802), then advertises a highest metric values for EIGRP (shown as 804), then advertise a max metric for OSPF (shown as 806), then set an overload bit for ISIS (shown as 808), and shutdown VPC features to isolate the VPC domain (shown as 810). In some embodiments, the network device may invoke GIR mode and features in routing protocols including, among others, Border Gateway Protocol Version 4 (BGPv4), BGP Version 6 (BGPv6), Enhanced Interior Gateway Routing Protocol (EIGRP), Enhanced Interior Gateway Routing Protocol Version 6 (EIGRPv6), Intermediate System-to-Intermediate System (ISIS), Open Shortest Path First (OSPF), Open Shortest Path First Version 3 (OSPFv3), and Virtual Port-Channel (vPC and vPC+).

Figure 9:
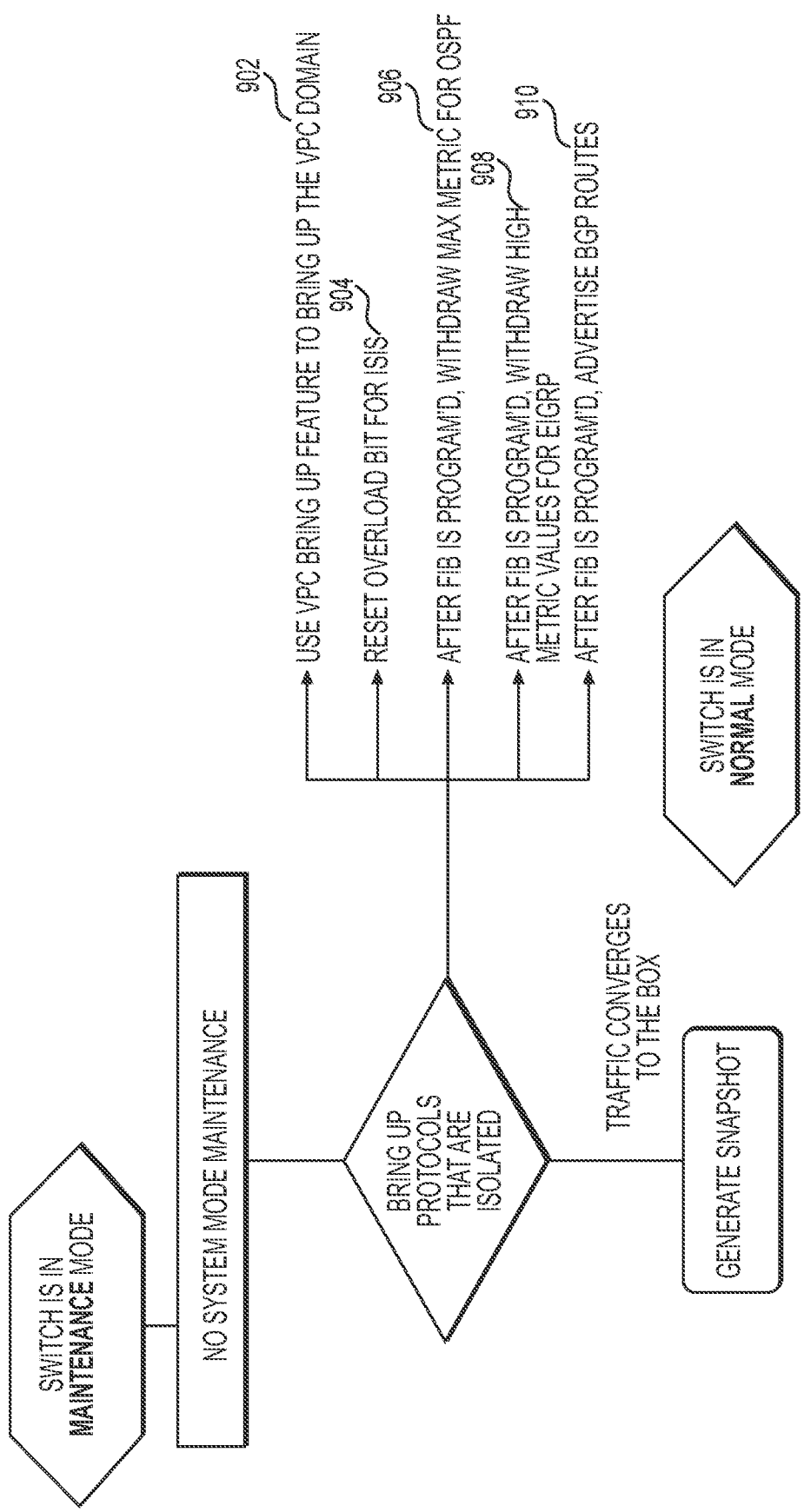

FIG. 9 illustrates a flowchart of a sequence to insert a network device. As shown in FIG. 9, to de-isolate a network device, the network device may use the VPC-bring-up-features to bring up the VPC domain (shown as 902), then reset the overload bit for ISIS (shown as 904). After the FIB is programmed, the network device may withdraw the max metric for OSPF (shown as 906), withdraw the high metric values for EIGRP (shown 908), and advertise BGP routes (shown as 910).

Example Command Line Interface

FIGS. 10, 11, 12, and 13 are each diagrams illustrating graphical user interface 1002 (e.g., a command line interface) associated with a network device when entering and exiting graceful insertion/removal (GIR) mode or maintenance mode, in accordance with an embodiment. As shown in FIG. 10, upon receiving a command line "system mode maintenance" 1004, the command line interface returns a list 1006 of operations to be taken, including isolating router BGP, OSPF, and ISIS interface. The command line interface 1002, in some embodiments, prompts (shown as 1008) the operator to confirm execution of the operation. Upon receiving a confirmation, the command line interface 1002, in some embodiments, lists status (shown as 1010) of actions of the network device to isolate the routing protocols. In addition, in some embodiments, the command line interface 1002 lists a status (shown as 1012) of broadcasting the maintenance mode to neighbor network devices. In some embodiments, the command interface may list status associated with the broadcasting, including, for example, a number of neighbor network devices to which the message was sent, a number of reply, a time for a response to be received. In some embodiments, the command interface may list statuses for each routing protocol to which a maintenance message is broadcasted.

FIG. 11 illustrates an example command to exit a network device from maintenance mode and to de-isolate the network device. As shown in FIG. 11, upon receiving a command line "no system mode maintenance" 1102, the command line interface returns a list 1104 of operations to be taken, including de-isolating router BGP, OSPF, and ISIS interface. Upon receiving a confirmation, the command line interface, in some embodiments, lists status (shown as 1106) of actions of the network device to isolate the routing protocols.

FIGS. 12 and 13 are example commands to isolate and to de-isolate a network device from neighbor network devices in relation to a shutdown sequence. In some embodiments, shutdown sequence may cause a LLDP message (e.g., a maintenance LLDP message or a shutdown LLDP message) to be transmitted to neighbor network devices and an acknowledge message to be received therefrom.

Example LLDP Message

Figure 14D:
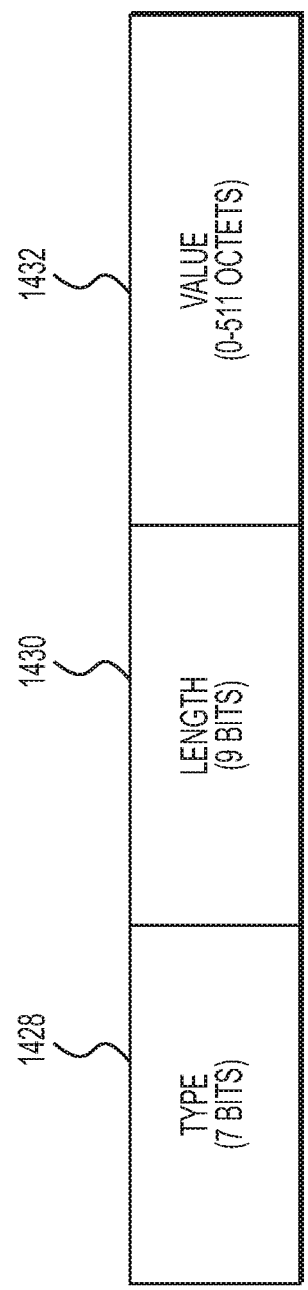

FIG. 14, comprising FIGS. 14A, 14B, 14C, and 14D, is a diagram illustrating an example maintenance LLDP message transmitted from a network device to enter graceful insertion/removal (GIR) mode or maintenance mode, in accordance with an embodiment. LLDP is a link layer protocol that allows an IEEE-802 LAN station to advertise the capabilities and current status of the station and to allow an LLDP agent to learn the connectivity and management information from adjacent stations. Details of the Link Layer Discovery Protocol is published by the IEEE Computer Society, for example, in "IEEE Standard for Local and Metropolitan Area Networks—Station and Media Access Control Connectivity Discovery", which is incorporated by reference herein in its entirety.

In some embodiments, a LLDP management client executing on the system generates the maintenance LLDP message, which may include GIR and protocol specific information bits, and sends the request as an advertisement to neighbor network devices. In some embodiments, the LLDP management client executing on the neighbor network device parses the LLDP message to modify the routing protocols thereat and/or then send an acknowledgement to the system.

As shown in FIG. 14A, the LLDP request 1400 comprises a LLDP message 1402 that includes a Link Layer Discovery Protocol Data Unit (LLDPDU) header 1404 and a LLDPDU body 1406. The LLDP message 1402 is encapsulated in an Ethernet frame 1408 comprising a destination media-access control (MAC) address 1410, a source MAC address 1412, an EtherType value 1414, and a frame check sequence field 1416.

As shown in FIG. 14B, the LLDPDU header 1404 comprises a chassis identifier (ID) TLV ("type-length-value")

1418, a port ID TLV 1420, a time-to-live TLV 1422, one or more optional TLV 1424 and an end of LLDPDU header TLV 1426.

Referring to FIGS. 14B and 14D, the chassis identifier TLV 1418 is a mandatory TLV that identifies the chassis containing the IEEE 802 LAN station associated with the transmitting LLDP agent. The chassis identifier TLV field 1418 comprises a 7-bit TLV type field (having a value of "1"), a 9-bit TLV information string length field (that specifies the length, in octets, of a chassis subtype field and a chassis ID field), an optional 8-bit chassis ID subtype field, and a chassis ID field (whose length is specified in the length field) comprising between 1 and 255 octets. The chassis ID field includes at least an octet string indicating a specific identifier for a particular chassis in the system.

Referring still to FIGS. 14B and 14D, the port identifier TLV 1420 is a mandatory TLV that identifies the port component associated with a transmitting LLDP agent. The port identifier TLV comprises a 7-bit TLV type field (having a value of "2"); a 9-bit TLV information string length field (that specifies the length, in octets, of a port ID subtype field and a port ID field); an optional 8-bit port ID subtype field, and a port ID field (whose length is specified in the length field) comprising between 1 and 255 octets. The port ID field is an alpha-numeric string that contains the specific identifier for the port from which this LLDPDU was transmitted.

Referring still to FIGS. 14B and 14D, the time-to-live TLV 1422 is a TLV that identifies in number of seconds that the recipient LLDP agent is to regard the information associated with the MAC service accessing point corresponding to a concatenation of the chassis ID field and the port ID field to be valid.

Referring back to FIG. 14B, TLVs, and optional TLVs, are defined by a TLV type. Type value "0" to Type value "8" define existing reserved TLV types including mandatory types (e.g., end of LLDPDU, chassis ID, port ID, time-to-live) and optional types (e.g., port description, system name, system description, system capabilities, and management address). Type value "9" to Type value "126" are reserved for future standardization. In some embodiments, the maintenance LDDP message and acknowledgement LLDP message is inserted into an optional value having a reserved TLV value, e.g., that is specific to an active device or an inactive device. To this end, a broadcast of a device as an inactive device can be used by neighbor network devices to modify its routing protocol to isolate the device from the network. And, a broadcast of a device as active can be used by neighbor network devices to add a routing or address identifier of the broadcasting device to its routing protocol. Other type of TLV values designation may be used, e.g., a reserved TLV may be assigned designation relating to maintenance state or isolation state One type of optional TLV is referred to as an organizationally specific TLVs (TLV Type="127"). In some embodiments, the maintenance LDDP message and acknowledgement LLDP message is inserted into an organizationally specific TLV. Organizationally specific TLV facilitates organizations (e.g., IEEE 802.1, IEEE 802.3, IETF) as well as software and equipment vendors to define TLVs that advertise information to remote entities attached to the same media. Organizationally specific TLV, in some embodiments, are transmitted in a one-way advertisement.

The maintenance LLDP message and acknowledgement message may have the same or different type of messaging structure. In some embodiments, the maintenance and/or acknowledgement LLDP message comprises a bit. In some embodiments, the bit message may have a binary value of "1" or "0" at a pre-defined field.

In some embodiments, the maintenance and/or acknowledgement LLDP message comprises a string. In some embodiments, the string message may be have a string value of "0x1" or a unique or type value associated a maintenance or GIR function.

In some embodiments, the maintenance and/or acknowledgement LLDP message comprises a symbol. In some embodiments, the symbol message may be have a symbol value of "Device entering GIR", "Device exiting GIR", "Device in GIR", "GIR", "Device in Maintenance", "GIR Acknowledged", "Maintenance Acknowledged", and variations thereof.

In some embodiments, the maintenance and/or acknowledgement LLDP message comprises a formatted string according to a markup language that indicates a system entering into maintenance mode.

A TLV, in some embodiments, comprises a variable length encoding of an information element consisting of sequential type, length, and value fields where the type field identifies the type of information, the length field indicates the length of the information field (e.g., in octets), and the value field contains the information. As shown in FIG. 14D, each TLV (e.g., 1418, 1420, 1422, 1424, and 1426) may have a structure comprising a type field 1428, a length field 1430, and value field 1432. The type field, length field, and value field comprises 7 bits, 9 bits, and between 0 and 511 bytes (or octets) depending on the value of the length field, respectively.

Although example embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense In some embodiments, other LLDP based protocols may be used. For example, proprietary protocols, such as the Cisco Discovery Protocol (CDP), Extreme Discovery Protocol, Foundry Discovery Protocol (FDP), Nortel Discovery Protocol (also known as SONMP), and Microsoft's Link Layer Topology Discovery (LLTD) may be used without departing from the spirit of the embodiments disclosed herein.

In some embodiments, the maintenance and acknowledgement message may be transmitted in LLDP extension protocols, such as the Media Endpoint Discovery Extension (LLDP-MED).

What is claimed is:

1. A system comprising:
   one or more network ports;
   a processor; and
   a memory having instructions stored, thereon, wherein the instructions, when executed by the processor, cause the processor to:
   receive a request to enter the system into a maintenance mode;
   in response to the received request:
   transmit, via at least one of the one or more network ports, to one or more first network devices including a first network device, a first message associated with entry of the system into the maintenance mode, wherein each of the one or more first network devices is receiving data and control traffic from, and transmitting data and control traffic to, the system, wherein the first message is transported via a standard transport layer to the each of the one or more first network devices, and wherein the system is isolated from each of the one or more first network devices when in the maintenance mode;

transmit, to one or more second network devices including a second network device, the first message, wherein each of the one or more second network devices is receiving data and control traffic from, and transmitting data and control traffic to, the system, and receive a second message from the each of the one or more first network devices to which the first messages were sent, wherein each second message comprises an acknowledgement by a given network device of the each of the one or more first network devices that the system is entering into the maintenance mode, wherein each second message is received via the standard transport layer from the each of the one or more first network devices, wherein receipt of the second message by the given network device causes two or more protocol interfaces operating at the given network device to isolate itself from the system;

enter the system into the maintenance mode upon receipt of the second message from each of the one or more second network devices to which the first messages were sent, wherein the step of entering the system into the maintenance mode comprises disabling a plurality of network interfaces of the system after a determination of the second messages having been received from each of the one or more first network devices, wherein each of the one or more first network devices comprises a first configuration of one or more one or more forwarding protocols, wherein each of the one or more second network devices comprises a second configuration of one or more forwarding protocols.

2. The system of claim 1, wherein in response to receiving the first message, each given first network device of the one or more first network devices is configured to modify a forwarding information base (FIB) or a routing information base (RIB) associated with the given first network device to remove a forwarding or routing identifier associated with the system therefrom.

3. The system of claim 1, wherein at least one of the one or more first network devices is configured to transmit, to the system, the second message when all protocol interfaces having a forwarding association with the system have been re-routed and converged to one or more different network devices.

4. The system of claim 1, wherein the instructions, when executed by the processor, cause the processor to:
disable a plurality network interfaces of the system, including at least one protocol interfaces configured to operate over at least one of the one or more network ports, the at least one protocol interfaces being selected from the group consisting of a Protocol Independent Multicast (PIM); a Border Gateway Protocol (BGP); an Enhanced Interior Gateway Routing Protocol (EIGRP); an Intermediate System-to-Intermediate System (IS-IS); an Open Shortest Path First (OSPF); a Routing Information Protocol (RIP); and a Virtual PortChannel (vPC).

5. The system of claim 4, wherein the instructions to disable the at least one protocol interfaces of the system comprises:

a first instruction to transmit a withdraw-BGP-route command via a BGP message;
a second instruction to transmit a highest-metric-value command via an EIGRP message;
a third instruction to transmit a maximum-metric-value command via an OSPF message;
a fourth instruction to transmit a set-overload-bit command via an IS-IS message; and
a fifth instruction to transmit an enable-VPC-shutdown-features command.

6. The system of claim 1, wherein in response to receiving the first message, each of the one or more second network devices is configured to remove a forwarding or routing identifier associated with the system from one or more forwarding paths maintained by the given second network device, wherein at least one of the one or more forwarding paths maintained by the given second network device has a protocol interface selected from the group consisting of a Protocol Independent Multicast (PIM) forwarding path; a Border Gateway Protocol (BGP); an Enhanced Interior Gateway Routing Protocol (EIGRP); an Intermediate System-to-Intermediate System (IS-IS); an Open Shortest Path First (OSPF); a Routing Information Protocol (RIP); and a Virtual PortChannel (vPC).

7. The system of claim 1, wherein the first message comprises a Link Layer Discovery Protocol Data Unit (LLDPDU) header and a LLDPDU body, and wherein the LLDPDU body includes an organizational-specific message associated with a maintenance advertisement.

8. The system of claim 1, wherein the instructions, when executed by the processor, further cause the processor to:
receive a second request for the system to exit the maintenance mode;
in response to the received second request, transmit, to the one or more first network devices, a third message associated with exit of the system from the maintenance mode.

9. The system of claim 8, wherein in response to receiving the third message, each given first network device of the one or more first network devices is configured to add a forwarding or routing identifier associated with the system to a forwarding table associated with the given first network.

10. The system of claim 8, wherein the instructions, when executed by the processor, further cause the processor to:
in response to the received second request, enable one or more protocol interfaces including a protocol interface selected from the group consisting of: Protocol Independent Multicast (PIM); a Border Gateway Protocol (BGP); an Enhanced Interior Gateway Routing Protocol (EIGRP); an Intermediate System-to-Intermediate System (IS-IS); an Open Shortest Path First (OSPF); a Routing Information Protocol (RIP); and a Virtual PortChannel (vPC).

11. The system of claim 1, wherein the first message is broadcasted by the system to all network devices neighboring the system.

12. The system of claim 1, wherein the instructions, when executed by the processor, further cause the processor to:
in response to receiving the request, cause presentation of, at a display of a remote network device associatively linked to the system, via a command line interface, a status comprising a first list of enabled protocols and a second list of disabled protocols.

13. The system of claim 1, wherein the first network device and second network device are each configured to modify one or more protocol interfaces having a forwarding or routing association with the system, and wherein the acknowledgement message is transmitted when the modified protocol interfaces have been re-routed and converged to one or more different network devices in the network.

14. The system of claim 1, wherein the first network device and second network device are each configured to modify one or more protocol interfaces having a forwarding or routing association with the system, and wherein the acknowledgement message is transmitted as the modified protocol interfaces are being re-routed and converged to one or more different network devices in the network.

15. A system comprising:
a processor;
a memory having instructions stored thereon, wherein the instructions, when executed by the processor, cause the processor to:
receive from a network device in a network, a first message associated with entry of the network device into a maintenance mode, wherein the system is configured to receive data and control traffic from, and transmit data and control traffic to, the network device, and wherein the system is isolated from the network device when the network device is in the maintenance mode;
wherein the first message is also transmitted by the network device to a second network device, wherein the second network device is receiving data and control traffic from, and transmitting data and control traffic to, the network device;
in response to receiving the first message, generate and transmit, to the network device, a second message, wherein the second message comprises an acknowledgement of the network device entering into the maintenance mode, wherein receipt of the second message by the network device causes two or more protocol interfaces operating at the network device to isolate itself from the system;
wherein the network device enters into the maintenance mode upon receipt of the second message from the system and the second network device to which the first message was sent,
reroute a plurality of network interfaces of the system after the second messages have been transmitted to the network device;
wherein the system comprises a first configuration of one or more one or more forwarding protocols, wherein the second network device comprises a second configuration of one or more forwarding protocols.

16. The system of claim 15, wherein the instructions, when executed by the processor, further cause the processor to:
in response to receiving the first message, remove, at the memory, a forwarding identifier associated with the network device from a forwarding table stored therein.

17. The system of claim 16, wherein the instructions, when executed by the processor, further cause the processor to:
receive, from the network device, a third message associated with exit of the network device from the maintenance mode;
in response to receiving the third message, add, to the memory, a forwarding identifier associated with the network device to the forwarding table.

18. The system of claim 15, wherein the second message is transmitted to the network device upon all protocol interfaces of the system having a forwarding association with the system being re-routed and converged to one or more different network devices.

19. The system of claim 18, wherein the instructions, when executed by the processor, further cause the processor to:
remove an identifier associated with the network device from one or more protocol interfaces of the system, wherein the one or more protocol interfaces includes at least one protocol interface selected from the group consisting of a Protocol Independent Multicast (PIM); a Border Gateway Protocol (BGP); an Enhanced Interior Gateway Routing Protocol (EIGRP); an Intermediate System-to-Intermediate System (IS-IS); an Open Shortest Path First (OSPF); a Routing Information Protocol (RIP); and a Virtual PortChannel (vPC).

20. A non-transitory computer readable medium having instructions stored thereon, wherein the instructions when executed by a processor of a system, cause the processor to:
receive from a network device, a first message associated with entry of the network device into a maintenance mode, wherein the system is configured to receive data and control traffic from, and transmit data and control traffic to, the network device, and wherein the system is isolated from the network device when the network device is in the maintenance mode;
wherein the first message is also transmitted by the network device to a second network device, wherein the second network device is receiving data and control traffic from, and transmitting data and control traffic to, the network device;
in response to receiving the first message, generate and transmit, to the network device, a second message, wherein the second message comprises an acknowledgement of the network device entering into the maintenance mode, wherein receipt of the second message by the network device causes two or more protocol interfaces operating at the network device to isolate itself from the system;
wherein the network device enters into the maintenance mode upon receipt of the second message from the system and the second network device to which the first message was sent,
reroute a plurality of network interfaces of the system after the second messages have been transmitted to the network device;
wherein the system comprises a first configuration of one or more one or more forwarding protocols, wherein the second network device comprises a second configuration of one or more forwarding protocols.

* * * * *

UNITED STATES PATENT AND TRADEMARK OFFICE
CERTIFICATE OF CORRECTION

PATENT NO. : 10,992,539 B2  
APPLICATION NO. : 16/679634  
DATED : April 27, 2021  
INVENTOR(S) : Srinivas Pitta et al.

Page 1 of 1

It is certified that error appears in the above-identified patent and that said Letters Patent is hereby corrected as shown below:

In the Claims

Column 14, Line 60 Claim 1, "one or more one or more" should read -- one or more --

Column 17, Lines 44-45 Claim 15, "one or more one or more" should read -- one or more --

Column 18, Lines 54-55 Claim 20, "one or more one or more" should read -- one or more --

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*